United States Patent [19]

de Delas y de Ugarte

[11] 3,895,782

[45] July 22, 1975

[54] PROCEDURES AND FACILITIES EMPLOYED FOR ELIMINATING OXYGEN IN OXIDES

[75] Inventor: Eduardo de Delas y de Ugarte, Barcelona, Spain

[73] Assignee: Servicios de Ingenieria, Proyectos Y Estudios/(SIPE), Barcelona, Spain

[22] Filed: Dec. 6, 1973

[21] Appl. No.: 422,197

Related U.S. Application Data

[63] Continuation of Ser. No. 195,077, Nov. 2, 1971, abandoned.

[30] Foreign Application Priority Data

Aug. 11, 1971 Spain .................................. 394143

[52] U.S. Cl. ................................................ 266/24
[51] Int. Cl. .............................................. C21b 1/04
[58] Field of Search ..................... 75/1, 3, 4, 33–37; 266/15–17, 19, 20, 24

[56] References Cited
UNITED STATES PATENTS

| | | | |
|---|---|---|---|
| 126,922 | 5/1872 | Blair | 75/37 |
| 171,812 | 1/1876 | Hunter | 266/24 |
| 1,256,623 | 2/1918 | Westberg et al. | 75/34 |
| 1,319,589 | 10/1919 | Jones | 75/34 |
| 1,759,173 | 5/1930 | Smith | 75/37 |
| 2,508,515 | 5/1950 | Hayward et al. | 75/34 |
| 2,663,631 | 12/1953 | Tschop et al. | 75/34 X |

*Primary Examiner*—Gerald A. Dost
*Attorney, Agent, or Firm*—Wenderoth, Lind & Ponack

[57] ABSTRACT

A method and apparatus for eliminating oxygen in oxides wherein a vertical retort is provided for treating a load of a mineral to be deoxidized and a solid reducer conventionally located in the interior of the retort. The retort has a preheating zone, a heating zone, a holding zone and a cooling zone. Means are provided for indirectly heating the load through the walls of the retort without contact at any time between the load and the means employed as heating agents. Means inject into the interior of the retort at different levels located underneath the heating zone preheated, highly reducing gases whereby an ascending flow is formed through the load to act as catalyzers for accelerating reactions in the load and as deoxidizing and treating agents for securing a carburized and desulfurized metal product. The reducing gases are CO and $H_2$.

3 Claims, 4 Drawing Figures

PATENTED JUL 22 1975
3,895,782
SHEET 1
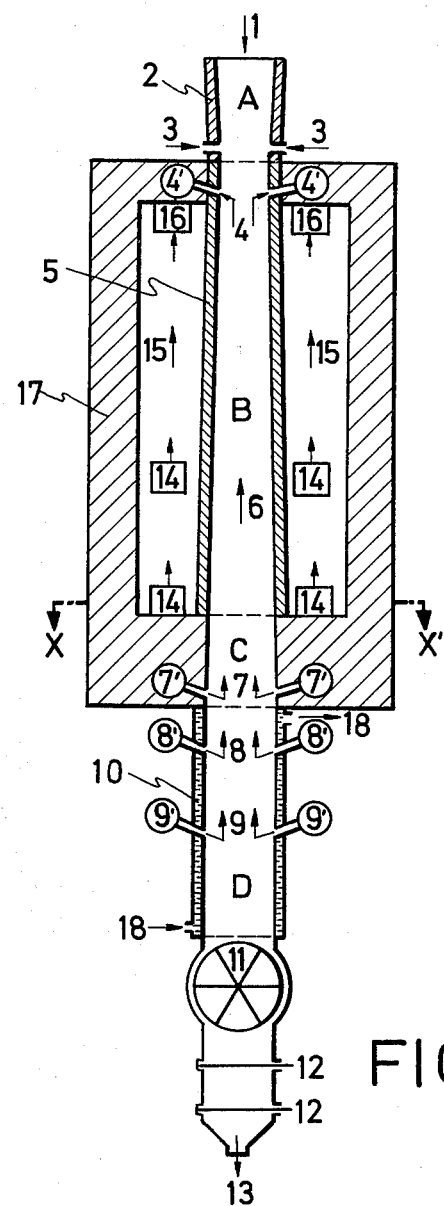
FIG-1
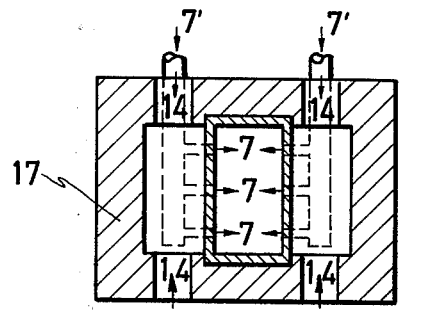
FIG-2  X-X'

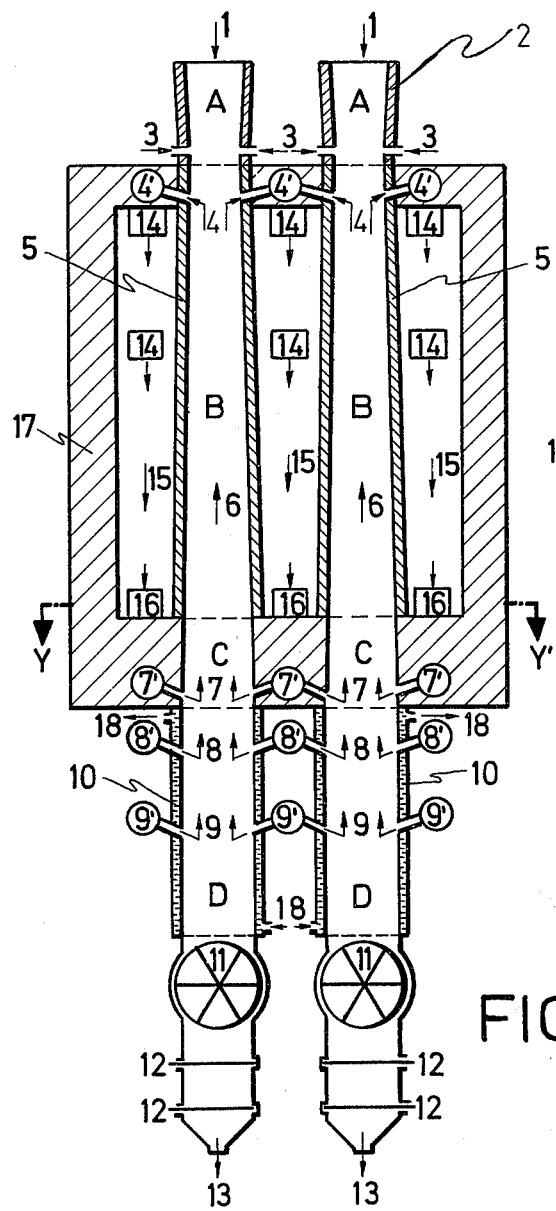
FIG-3
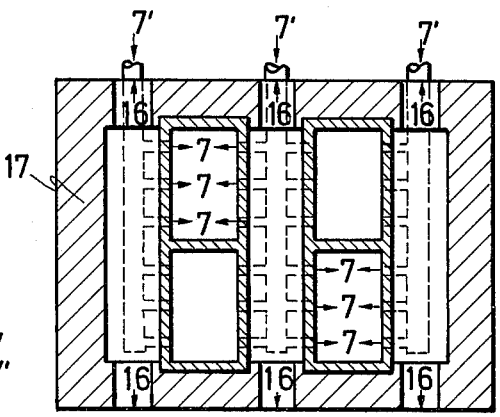
FIG-4 Y-Y'

PROCEDURES AND FACILITIES EMPLOYED FOR ELIMINATING OXYGEN IN OXIDES

This is a continuation, of application Ser. No. 195,077, filed Nov. 2, 1971 and now abandoned.

Iron is the metal mostly utilized by man. It is obtained from its ores which in the majority of cases are found in nature in the form of oxides. For this reason they must be reduced; that is to say, their oxygen must be removed.

From the Metal Age to date man has proposed innumerable procedures and facilities for reducing iron ore, the blast furnace being the most important of all.

Notwithstanding the fact that almost the entirety of iron ore is reduced in the blast furnace, it has always been endeavored to dismiss this process because installations of such type require a major investment (prohibitive for certain countries) and because metallurgical coke (very scarce throughout the world) is required for ore reducing.

Among the processes and facilities proposed for substituting the blast furnace are those known as low temperature reduction (lower than that for softening and melting the iron) which yield a solid product generally known as spongy iron, as in the present case.

In this regard we might indicate that over one hundred years ago, procedures and facilities were patented for reducing iron ore at low temperature. A solid reducer (coal) was utilized which, when mixed with the ore, was loaded into vertical reduction retorts.

The retorts were extremely heated on the outside, the load (mineral and reducer) contained within receiving its heat indirectly.

Once reduction of the mineral (a rather incomplete reduction) was accomplished, the load was cooled before being removed from the furnace.

Not only were processes and facilities proposed and patented, but various installations were mounted in several countries, Spain included.

Among the various procedures and devices proposed many years ago, those of Chenot, Blair and Yates were of importance. Chenot's work, patents included, was initiated around 1855. Blair and Yates began somewhat later. The facilities employed by all of them consisted of furnaces with one or more vertical reduction retorts, the transversal-horizontal section of same being circular, rectangular, etc. The retorts were constructed with refractory material: hence a poor heat conductor.

The cited procedures and facilities did not yield good results, since they could not compete with the blast furnace for, as we have indicated, ore reduction was rather incomplete. Further, it required heavy power consumption to heat as a result of it being indirect (through the walls of the retorts, poor heat conductors).

Undoubtedly Chenot and others wanted to avoid the latter, and altered the heating method, forcing part of the heating gases through the load. The hoped for results not having been achieved, their installations closed down, one after the other.

The same was the case much more recently in connection with installations likewise based on the Chenot principle with indirect heating of the load. However, good heat conduction materials were utilized (silicon carbide, heat resistant steel, and special alloys among others) in the construction of vertical retorts. Production per retort at these installations was low, reduction of the mineral quite insufficient, and power required for heating continued to be excessive. Since these installations were likewise unable to compete with those based on the blase furnace, they suffered the same fate of those of Chenot, Blair and Yates. To date there is no knowledge of the existence of an installation of such type anywhere in the world.

In view of the current great interest of many countries in processes for reduction at low temperature, an exhaustive study has been made of the processes and facilities employed by Chenot, Blair, Yates and others who utilized vertical reduction retorts with indirect heating of the load contained therein. It was the purpose of this study not only to ascertain the causes for which results of said processes and facilities were poor, but also to determine accurately and certainly whether said processes and facilities might be improved in light of said causes so that they could compete with reduction installations based on the modern blast furnace.

The results of such studies have been frankly satisfactory, there being no doubt that by employing the improvements in process and facilities to which we will refer later, a product highly competitive with that of the blast furnace will be achieved which will at the same time resolve some of the major problems experienced currently in the metallurgical field. These are:

To allow creation in many developing countries (often rich in minerals) of integral metallurgical installations based on reduction at low temperature.

The capacity of these installations would adjust to the national demand for iron and steel products, as well as to its economic possibilities (installations based on the modern blast furnace require heavy investments which many countries are unable to finance, and their large production cannot always be absorbed by the country).

Installations for reduction at low temperature are profitable, with production much lower than that considered minimum for a modern, profitable blast furnace. Investments required per ton/year installed are likewise much lower.

Industrialization of said countries would thus be promoted and in so resolving their needs for iron and steel products, they would cease to be mere exporters of minerals and other raw materials.

To effect reduction of iron ores without having to resort to metallurgical coke, indispensable in blast furnaces and a real problem the world over due to the scarcity of coal for coking.

This would benefit not only the developing countries (frequently lacking in coal for coking and in coke), but also the more industrialized countries. An example in point is the fact that the United States, notwithstanding their exports of coal for coking or coke to half the world, are beginning to install facilities for reduction at low temperature.

The study to which reference was previously made revealed without a doubt that reactions between the reducer and the mineral in indirectly heated vertical reduction retorts occurred under very poor conditions. As a consequence: "reactions initiated slowly in the coldest area of the retort (upper part of same), continued at a slight pace during the time the load passed through the center of the retort, they then decreasing in intensity until they were almost nil or nil as they passed through the heated (lower) section of the retort."

As a result of the foregoing:

The reduction retort was only partially utilized (in its upper and central areas), where temperatures not being high, reactions could not be energetic.

That the reactions commenced to decrease in intensity when a certain rather incomplete degree of ore reduction was attained, this taking place in the central-low part of the retort.

That lacking reducing gas, reactions were already minimal in the lower section of the retort which was generally the best heated.

Practical results of all this were:

Obtention of a product - spongy iron - with reduction not generally high, since reaction commenced to be interrupted precisely when a certain degree of reduction was achieved.

Low production per retort as a consequence of not utilizing more than the upper and central sections, where reactions were not energetic.

High consumption for heating the load. While this is always the case in any indirect heating system, it was accentuated in the cases under consideration due to the coincidence of the most heated part with a zone in which there were practically no reactions.

An expensive product of average quality was obtained which could not compete with the product of blast furnaces.

The petitioning inventor, Industrial Engineer and engineering firm have made a careful study of the problem and carried out a variety of tests, having reached the conclusion that past failures may be entirely resolved by:

1.- Fully utilizing the heating retort; even a part of the cooling retort can be utilized for reduction purposes.

2.- That reduction take place energetically at all times, without interruption, whereby high reductions will be achieved, this being desirable for a quality product it has not been possible to obtain heretofore.

3.- Because energetic and uninterrupted reduction reactions are accomplished in a heated retort, this retort being fully utilized, a high productivity per retort will be obtained, with the corresponding decrease in heating costs, among others.

4.- Said retorts can be utilized not only for mere reduction of iron ore in the manner indicated, but reduced iron obtained may be treated, carburizing it more or less as desired and lowering its sulfur content. This is most important for it would give us a furnace for reduction and treatment of iron ores, rather than a mere reduction furnace for the cited minerals.

These four results will be obtained by the use of gases foreign to those for heating. They are strong reducers which will be inserted in the retort at various levels, the highest of them at a level inferior to that of the lowest part of the heating or heated retort.

Accomplishment of the foregoing constitutes the improvements in procedures and facilities employed for eliminating oxygen present in oxides, the object of the invention in question.

These improvements applied:

a. In procedures in which the load (mineral to be deoxidized and solid reducer) conventionally located inside the retort being heated indirectly through the walls of same. At no time will there be contact between the load and the means employed as a heating agent or the heating gases, should there by any, depending on the fuel, or source of energy utilized for causing said heating; they consist in injecting into the interior of the retort at different levels beneath the area of the retort conventionally known as the heating area, preheated, highly reducing gases, such as CO and $H_2$, either jointly or separately, so that said gases, forming an ascending flow through the load, will act upon it as catalyzers, speeding the reactions occurring in said load and as deoxidizing and treating agents, thus improving the features of the product obtained which will be carburized, desulfurized metal.

b. In facilities constituted by one or more vertical retorts located inside the furnaces and through which a source of heat runs and transmits itself indirectly to the load in the interior of the retort in the heating area, emerging from the furnace through its top, an area in which the load is arranged, called the preheating area, and in its lower part, a cooling area connected to means for extracting the product, there being between the cooling and heating areas another called the holding section, where the temperature of the load is maintained when the latter falls of its own weight toward the lower areas. These improvements consist in equipping the retort in the holding and cooling areas with a number of intake conduits at diverse levels, complemented by others for release which are situated near the upper extreme of the heating area. Both conduits are located under the heating area connected to means capable of injecting gas or a mixture of preheated gases into the retort. The conduits are located in the upper part of the heating area connected to means for extracting the gas or gases injected from underneath, as also to those produced inside the retort.

For a better understanding there is attached a set of drawings to which reference will be made in explaining the figures below. These drawings will serve as a demonstrating scheme not limitative, however, of the principal features of the deoxidizing and treating facilities, and their operation.

FIGS. 1 and 2, respectively, show the elevation and plan of a deoxidizing and treating facility in one retort only, a facility heated in its lower area in which the heating gases move upwards.

FIGS. 3 and 4, respectively, show the elevation and plan of a facility equipped with two double retorts arranged in battery, a facility heated from its upper section and in which the heating gases circulate downwards.

In order to avoid reiterative descriptions and to enable an understanding of the figures corresponding to each of the facilities, the homologous components of same have been marked with the same references, thus:

A shows the retort in its first, preheating, part with: 1. load entering the retort; 2. walls of same constructed with refractory-insulating material, and 3. air inlets to the preheating retort, said inlets being uniformly distributed on the periphery of the retort. B. shows the second, heating, part of the retort, having: 4. retort gases reaching the upper part of its heating area that emerge from same through a number of openings arranged for the purpose on the larger lateral walls thereof; 4'. conduits through which the above gases are conveyed out of the furnace by suction, where elimination of $H_2O$ (by condensation) and $CO_2$ (absorption) is effected, whereby the remaining gas (mainly formed by CO and $H_2$) can be utilized again; 5. walls of retort which in that heating zone will be of silicon carbide or material having analogous properties, the retort a notably rectangular section, its lesser walls being vertical and the larger ones being vertical or slightly inclined in order to facilitate descent of the load through its interior, and 6. gases in the retort ascending through the interior of its heating area. C. shows the third area of the retort, its holding section, with: 7. inlets for highly reducing gas to the holding section through a number of orifices situated for the purpose on its walls, which can be of silicon carbide or any other appropriate refractory material; 7'. intake conduits for highly reducing gases for that area of the retort. D. is the fourth, cooling, area of the retort, showing: 8. and 9. inlets for highly reducing gas to that cooling area through a number of orifices situated for the purpose on its walls which will be of double iron plate with forced circulation of cooling water between same; 8'. and 9'., conduits for entrance of highly reducing gases for that part of the retort; 10. walls of the retort in that cooling area, the height of which will be sufficient for the deoxidized iron and other components of the load to arrive totally cooled at the lower end; 18. inlets and outlets for cooling water from that section of the retort; 11. shows the unload mechanism of the facility which, being of any of the types employed for the purpose in the industry (revolving drum, for example), will in the same continuous fashion extract the deoxidized and cooled load, there being an unload mechanism for each retort; 12. shows the closing system for the lower part of the retort and is constituted by two valves which cannot be opened simultaneously and which, alternately operated, will permit continuous release of the load without allowing access of substantial amounts of air to the interior of the retort; 13. shows deoxidized and cooled ore being released from the facility together with the excess reducer which was loaded and not utilized, and the ashes of the utilized reducer; 14. shows inlets in the heating device used, the facility in FIGS. 1 and 2 having "heating through the lower part," and that in FIGS. 3 and 4 "heating through the upper part"; 15. shows heating gases of the retort which will be ascending in FIGS. 1 and 2, and descending in FIGS. 3 and 4; 16. shows outlets of the facility for gases for heating the retort, and 17. shows the lining of the facility which is of a refractory and insulating material.

Loading of the retorts will be effected at regular intervals and, of course, from its upper (preheating) area, drying and heavy preheating of same subsequently occurring in this zone. These two effects will be achieved by heat produced in combustion of gases which reach the preheating area by ascending through the interior of the retort, and of a small amount of the reducer which, being loaded in excessive quantity, will accompany the ore along with a quantity of air introduced through the openings located for that purpose in a lower part of the preheating area. Since the atmosphere in this first area of the retort will be oxidizing, there will be no deoxidizing of the ore in same. Deoxidizing will be initiated at the moment at which the heavily preheated load enters the second, heating, part of the retort, the atmosphere of which will be highly reducing.

The load will be formed by the ore to be deoxidized and treated, and by the solid reducer utilized; this latter may have added to it an appropriate desulfurizer in order to prevent the sulfur in the reducer from contaminating the ore.

The mineral will be loaded crushed-sifted, or agglomerated (briquet, sinter, pellet, etc.), whichever. When iron minerals are to be deoxidized and treated, any natural or artificial oxide (hematites, magnetite, calcinated carbonate, roasted pyrite ashes, etc.) may be utilized. While crude (uncalcinated) iron carbonates could be loaded, for reasons of economy it is desirable to calcine them prior to loading onto the deoxidizing and treating facility.

The reducer will likewise be sifted, for which any kind of known solid reducer (anthracite, metallurgical coke, non-metallurgical coke, semicoke, partially distilled coal, distilled lignite, charcoal, etc.) may be utilized. In event the reducer should have an amount of sulfur (S) such that it might contaminate the mineral, an appropriate quantity of any desulfurizer (limestone, lime, dolomite, etc.) may be added to prevent this from occurring.

The load will finally be constituted by a close mixture of the mineral and the reducer (which will always be added in excess of the required quantity), plus the desulfurizer (should this prove necessary).

In event the mineral is loaded as an agglomerate (briquet, sinter, pellet, etc.), the latter may have added to it all or part of the reducer and necessary desulfurizer.

Deoxidizing of the mineral will be initiated at the moment at which the load, highly preheated in the first area of the retort, penetrates the second or heating part of same, where it will encounter a highly reducing atmosphere.

Thus the deoxidizing process will begin which will be that of a "mixed reducer" since deoxidizing takes place with two very different reducers: the solid reducer (which, having been mixed with the mineral prior to its loading onto the furnace will stay with it during its entire course through the four areas of the retort) and the gaseous reducer (which, having been injected into the retort in its cooling and holding areas, will be in contact with the mineral, circulating through the retort inversely thereto in its cooling area in the upper half of same, and in its holding and heating areas).

The retort walls in this second, heating, part, will be of silicon carbide, a material which not only is resistant to high temperatures without becoming deformed or altered, but further, is well known for its high thermal conductivity, this being basic to an "indirect heating" facility in which heating of the load will be effected by passage of heat through its walls, there being no communication through them which might place the load inside in contact with the means utilized for heating, which circulate on the exterior of the retort.

A metal, alloy, etc., might be utilized in place of silicon carbide, the former having properties similar to those of the silicon carbide. At this time, substituting materials are not available in regular industry which are equal to or better than silicon carbide. However, there must be borne in mind that materials are being developed and utilized in aerospacial industries . . . materials which may become available at any time for other uses.

It should be kept in mind that the lesser walls of this second part of the retort will be vertical, their transversal horizontal section being notably rectangular, while the larger walls of same may be slightly inclined to facilitate descent of the load through its interior.

Facility heating will be effected between the levels corresponding to this second, heating, part of the retort. Any fuel or combination of fuels, whether solid, liquid, gaseous or other heating (burned gases, hot air, electric power, etc.) may be utilized.

Heating gases will circulate between the indicated levels along the retort walls with a normally vertical movement (ascendant or descendant, depending on the manner in which the gases emanate from the facility - bottom or top). They may also circulate in other ways.

The third (a) part of the retort, the holding section (c) will retain and maintain the load in its interior for a certain time at a high temperature in such a way that the deoxidizing process taking place at a brisk pace within, the load finally reaches the fourth and last cooling part of the retort (d) highly deoxidized.

In order to accomplish the latter, the deoxidizing process to continue therein at a brisk pace, a certain amount of reducing gas will be injected into the load, having it pass to the interior of the holding retort through a number of openings arranged for that purpose on its walls. Thus, that section of the retort, rather than lacking reducing gas, which is what happens in facilities equipped with vertical reducing retorts indirectly heated and in which deoxidizing is accomplished by means of a solid reducer, will be filled with highly active reducing gas at an appropriate temperature, and for this reason and thanks specifically to the reducing gas injected, the deoxidizing process will continue at a good pace.

By injecting highly reducing gas at an appropriate temperature into the holding section of the retort, the reactions in that holding section and in the lower, heating section, also with a slight amount of gas, will be notably activated.

In effect, this will be increased and improved by injecting more reducing gases, always at an appropriate temperature, in the fourth and last area, the cooling section of the retort, at two or more levels through the openings situated for that purpose on its walls.

For this injecting to be accomplished at the indicated levels, the following will be utilized as reducing gases: CO (carbon oxide), and $H_2$ (hydrogen), either combined or separate.

With these gases, not only will deoxidizing of the ore be improved and production per retort increased, but the metal obtained will be treated. For purposes of deoxidizing the mineral it will be kept in mind that CO is particularly active at temperatures between 900° and 1,050°, while $H_2$ requires 500° to 600° and between 1,000° and 1,100°. Equally there shall be borne in mind that reduction of iron oxides with CO is slightly exothermal, while reduction of same with $H_2$ is slightly endothermal. At 900°, reduction of iron oxides with a mixture of CO and $H_2$ containing approximately 48% $H_2$ is athermic. CO and $H_2$ gases ascending through the interior of the retort will contribute to the improvement of deoxidizing of the ore therein, since the flow of gases and their deoxidizing power increases.

For purposes of treating the reduced iron ore it will be kept in mind that $H_2$ will serve to decrease its sulfur content (S), while by changing the proportion of CO in the retort there may be obtained as desired, highly varied iron with carbon (C) from 0.2% (this would be the case with a representative carbon by effecting deoxidizing with a solid reducer only), up to 1% (employing the CO gaseous reducer plus the solid reducer).

The fact that the sulfur (S) can be reduced and increased, and the carbon (C) content varied, are two points of high significance as is well known in siderurgy.

The gases ascending through the interior of the retort will be mainly formed by CO and $CO_2$ (produced in the reactions between the ore and the solid reducer loaded), CO and $H_2$ (injected) + $CO_2$ and $H_2O$ (produced in the reactions between the ore and the reducing gases injected). There will also be some small amount of Nitrogen ($N_2$) from small quantities of air which may have entered the retort through the dual valve closing system in its lower section.

These gases will be eliminated from the facility by suction, the CO—$H_2$ being recovered and the $CO_2$ being eliminated (by absorption) and the $H_2O$ (by condensation).

The CO and the $H_2$ recovered will be utilized again either in the same facility (as reducers or for heating the retorts), or outside same (for any other use).

The deoxidized and cooled mineral, together with the solid reducer loaded in excess and not utilized, will be removed from the facility by the unloading mechanism situated in its lower section. A two-valve closing system located in the lower part of each retort which valves cannot be opened simultaneously, will enable emptying or unloading of the retort without air penetrating its interior in any appreciable quantity.

I claim:

1. Means for performing highly efficient low temperature oxide reduction comprising a vertical retort for treating a load of a material to be deoxidized, said retort having an opening at the top thereof for the introduction of said material mixed with a solid reducer into the interior of said retort, said solid reducer causing a large proportion of the reduction of said material, said retort further having, from top to bottom, a preheating zone, a heating zone, a holding zone, and a cooling zone; means for indirectly heating said load through the walls of said retort, said load and the means employed as heating agents being kept separated at all times; means located beneath said heating zone for injecting into the interior of said retort at a plurality of different vertical levels an excessive amount of a preheated, powerful reducing gas, whereby an ascending flow of gas is created through said load which acts as a catalyzer for accelerating the reactions in said load to complete the reduction thereof, the reducing process being initiated upon entrance of the mixture into the reducing zone, and which acts as a deoxidizing and treating agent for securing a carburized and desulfurized metal product, the product of said reaction ascending within said vertical retort and directly heating material in the preheating region.

2. Means as set forth in claim 1, wherein said reducing gas is selected from the group consisting of CO, $H_2$ and a mixture of CO and $H_2$.

3. Means as set forth in claim 1, further including means located adjacent the top of the heating zone for extracting gases from the upper zone of the retort, means for separating unused reducing gases from said extracted gas, and means for reinjecting said separated reducing gases into said injecting means located beneath said heating zone.

* * * * *